UNITED STATES PATENT OFFICE.

JOHN T. ROBINSON, OF NEW YORK, N. Y., ASSIGNOR OF ONE-FOURTH TO JAMES H. FERGUSON, OF SAME PLACE.

CARBON FOR ELECTRIC-ARC LIGHTS.

SPECIFICATION forming part of Letters Patent No. 642,826, dated February 6, 1900.

Application filed August 2, 1898. Serial No. 687,489. (No specimens.)

*To all whom it may concern:*

Be it known that I, JOHN T. ROBINSON, of the city of New York, borough of Manhattan, State of New York, have invented a new and useful Improvement in the Treatment of Carbon Electrodes for Electric-Arc Lights, of which the following is a specification.

The objects of this invention are threefold—viz., the prolongation of the life of the carbons, the improvement in the quality of the light which they emit, and an economy in the voltage or power required to produce a given candle power. To obtain these results, I take ordinary so-called "carbons" or carbon electrodes—such, for example, as those now to be found in the market and used for electric-arc lamps—and I soak them from two to four days, according to size, in a solution obtained by dissolving in a solution of caustic alkali the soluble constituents of certain kinds of asbestos, consisting principally of silica and alumina.

In carrying out my invention I first obtain an aqueous solution of caustic potash or caustic soda of a density of 30° to 32° Baumé. I then add to the said solution a quantity of powdered asbestos, generally in the proportion of about five hundred (500) grams of the asbestos to ten thousand (10,000) cubic centimeters of the said solution and allow the said solution to stand at ordinary atmospheric temperature or at any temperature between that and the boiling-point for from four (4) to twenty-four (24) hours, according to temperature, (a higher temperature requiring a shorter time,) or until the solution has, by reason of the soluble constituents of the asbestos which it has taken up, a density of from 35° to 40° Baumé, while its volume is maintained by the addition of water.

In the compound solution obtained as above described at the higher temperature mentioned, and which has been found by analysis to contain silica in the proportion of 0.157 per cent. and alumina in the proportion of 0.042 per cent. of the weight of asbestos treated, I soak the carbon electrodes bodily for a less or greater time, according to their diameter. Carbons of three-eighths of an inch diameter may be soaked in the solution for about two days and those of half an inch in diameter for about four days, after which they are dried in any suitable manner. Carbons thus treated have when dried an average increase in weight of nearly ten per cent.

The asbestos which I have successfully used in carrying out my invention is what is known as the "talcous" kind, which is found in large quantities in the Dominion of Canada and especially in Nova Scotia, and which is the kind most extensively known and used in this country for paints, roof-sheathing, cements, steam-packings, and fireproofing.

What I claim as my invention is—

The process of treating carbon electrodes for improving their quality which consists in soaking them bodily in a compound solution obtained by subjecting talcous asbestos to the dissolving action of a solution of caustic alkali, substantially as herein described.

In testimony that I claim the foregoing as my invention I have signed my name, in presence of two witnesses, this 30th day of July, 1898.

JOHN T. ROBINSON.

Witnesses:
   FREDK. HAYNES,
   EDWARD VIESER.